United States Patent [19]

Lamer

[11] Patent Number: 4,531,604
[45] Date of Patent: Jul. 30, 1985

[54] HYDRAULIC STEERING SYNCHRONIZATION SYSTEM

[75] Inventor: Gerald P. Lamer, Sturgeon Bay, Wis.

[73] Assignee: Marine Travelift, Inc., Sturgeon Bay, Wis.

[21] Appl. No.: 580,668

[22] Filed: Feb. 16, 1984

[51] Int. Cl.³ ............................................. H04M 1/04
[52] U.S. Cl. ..................................... 180/152; 180/140
[58] Field of Search ....................... 180/152, 132, 140; 280/98, 103

[56] References Cited

U.S. PATENT DOCUMENTS

| | | | |
|---|---|---|---|
| 3,075,603 | 1/1963 | Baudhuin | 180/152 |
| 3,446,308 | 5/1969 | Hann | 180/152 |
| 3,645,406 | 2/1972 | Brazell | 180/152 |

FOREIGN PATENT DOCUMENTS 1439003 9/1976 United Kingdom ................ 180/152

Primary Examiner—Henry Bennett
Attorney, Agent, or Firm—August E. Roehrig, Jr.

[57] ABSTRACT

A hydraulic steering synchronization system for use with straddle-type mobile cranes wherein upon actuation of the system and movement of the steering wheels through a normal side-to-side cycle, the movement of the steering wheels provides a signal to effect a balancing flow of hydraulic fluid to the hydraulic cylinders which control the movement of the steering wheels to effect resynchronization of their position, and to correct any misalignment therebetween.

5 Claims, 3 Drawing Figures

HYDRAULIC STEERING SYNCHRONIZATION SYSTEM

BACKGROUND OF THE INVENTION

This invention relates in general to hydraulic steering systems for straddle-type cranes and, in particular, to a synchronization system for automatically synchronizing the steering system utilized on such cranes. More specifically, but without restriction to the particular use which is shown and described, this invention relates to a hydraulic steering synchronization system for use on straddle-type cranes wherein synchronization between the steering wheel on either side of the crane may be resynchronized automatically or upon operator actuation of the system and steering the wheels through a normal steering limit cycle.

For convenience of illustration, the hydraulic steering synchronization system will be described with reference to its use on a sling-rigged straddle crane which is especially suitable for use in handling watercraft. However, it is to be understood that the steering synchronization system is equally applicable to other straddle-type cranes used for industrial or commercial purposes, such as freight loading, containerized shipping for materials handling. In all of such straddle-type cranes, a hydraulic steering system is used that includes a hydraulic cylinder and mechanical linkage on each side of the crane to control the steering angle of steerable tires and to provide accurate tracking of the non-steering or travel tires. Such a steering system is designed so that the non-steering or travel wheels of the straddle crane, track the travel of the steering wheels when traveling in a straight-line motion, or through a steering/cornering motion. This type of steering system is referred to by those skilled in the art as the "Ackerman" steering system.

Since the steering wheels are not physically connected or mechanically linked one to the other, when a differential exists in the hydraulic system of the left and right steering cylinders, actuation of these cylinders and the resultant movement of the steering wheels, is no longer synchronized. As a result, tire scuffing and scrubbing occurs which not only causes unnecessary and excessive tire wear, but can create a lateral force in the frame structure which could create a safety hazard.

Heretofore, when the steering wheels were caused to go out of synchronized alignment, or found to be so, the machine operator or a mechanic was required to manually bleed the hydraulic cylinders in order to resynchronize the steering system and again place the steering wheels in proper alignment. The operator or mechanic was required to manually operate needle-type cross-circuit valves to bleed hydraulic fluid from one hydraulic cylinder to the other. Not only is this manual operation cumbersome and time consuming, but frequently machine operators did not resynchronize the steering system until the misalignment had become quite excessive. Since the crane had to be taken out of operation to manually resynchronize the steering system, in busy seasonal types of operations such misalignment frequently became quite excessive.

SUMMARY OF THE INVENTION

It is, therefore, an object of this invention to improve the synchronization system for steering straddle-type mobile hoists.

Another object of this invention is to automatically resynchronize the steering system of a straddle-type hoist by turning the steering system through a normal side-to-side steering cycle.

Still another object of this invention is to automatically bleed hydraulic fluid from one hydraulic cylinder to the other to effect resynchronization of the steering wheels, and to correct any misalignment therebetween.

These and other objects are attained in accordance with the present invention, wherein there is described a embodiment of a hydraulic steering synchronization system for use with straddle-type mobile cranes wherein upon actuation of the system and movement of the steering wheels through a normal side-to-side cycle, the movement of the steering wheels provides a signal to effect a balancing flow of hydraulic fluid to the hydraulic cylinders which control the movement of the steering wheels to effect resynchronization of their position, and to correct any misalignment therebetween.

DESCRIPTION OF THE DRAWINGS

Further objects of the invention, together with additional features contributing thereto and advantages occurring therefrom, will be apparent from the following description of a preferred embodiment of the invention which is shown in the accompanying drawings with like reference numerals indicating corresponding parts throughout. While the drawings illustrate a preferred embodiment of the invention, and the best manner presently known for carrying out the invention, it is to be understood that these drawings only depict one embodiment of the invention, and the invention may be incorporated in embodiments other than that which is illustrated in the drawings, wherein.

DESCRIPTION OF A PREFERRED EMBODIMENT

Figure 1:
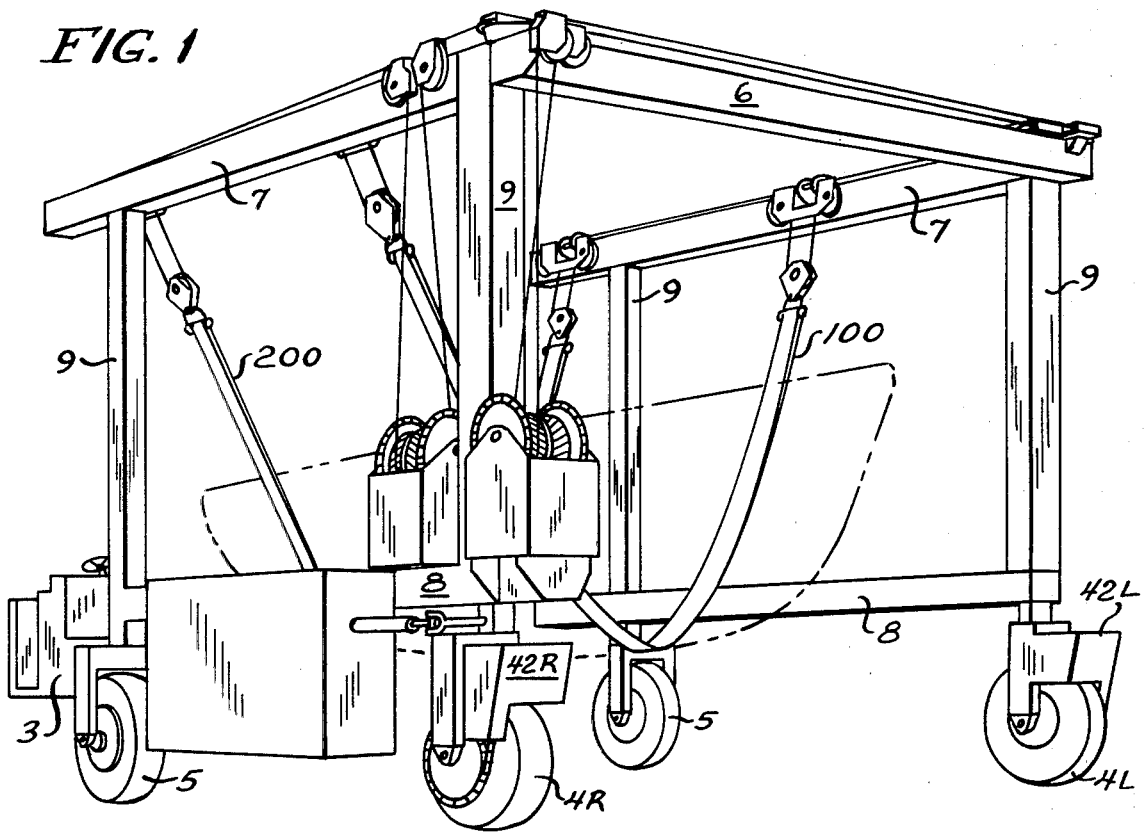
FIG. 1 is a frontal, perspective view of a straddle-type mobile crane or hoist illustrating the "Ackerman" type steering system employed therein utilizing a left and right hydraulically coupled steering wheel, and a left and right travel wheel.

Referring now to FIG. 1, there is shown a straddle-type mobile hoist or crane, sling-rigged for handling watercraft such as illustrated in phantom. Such straddle cranes utilize a load-lifting apparatus such as the two slings 100 and 200 which are positioned beneath the hull of the ship for raising or lowering the ship to remove or place the ship in the water, or to transport the ship over land to a repair or storage facility. The rearward or aft end of the hoist (not shown) is entirely open, and the forward end is joined at the upper end thereof by a transversely-extending cross beam 6 which connects and parallelly spaces two longitudinally-extending support beams 7 carried at the upper end of four vertically-extending columns 9 which are supported at their lower end on a pair of longitudinally-extending lower support beams 8 positioned parallel to the upper support beams 7.

The hoist is supported for movement upon wheels or tires 4 and 5 carried, respectively, at the forward and rearward end of the hoist. The rear wheels 5 are travel wheels and desirably track the movement of the front steering wheels 4 indicated by reference numerals 4L and 4R to indicate the forward left and forward right steering wheels, respectively.

An operator station 3 is positioned at the rear of the hoist whereat the operator steers the crane and controls the various functions of the lifting mechanisms. The controls for effecting the resynchronization of the steering system are actuated by the machine operator from this station.

Each of the steering wheels 4L and 4R has a double-acting hydraulic cylinder 40L, 40R connected thereto through a mechanical linkage 41 to a yoke 42L, 42R in which each wheel is rotatably supported. Upon extension or retraction of the cylinder plunger 43 from the neutral position shown, the yoke 42L, 42R within which the steering wheel 4L, 4R are each rotatably supported, will pivot the steering wheels relative to the straddle crane to effect steering. Since the hydraulic cylinders 40L, 40R are not interconnected by any mechanical linkage, synchronization of the movement of the steering wheels in order to maintain their alignment, must be effected by controlling the movement and positioning of the plungers 43 associated with each of the hydraulic cylinders 40L, 40R operatively connected to the separate steering wheels 4R and 4L.

After the steering wheels 4R, 4L have been initially aligned, in the event leakage of hydraulic fluid occurs anywhere in the hydraulic circuit, the synchronization of steering wheel movement will be effected resulting in the misalignment of the steering wheels. To correct this misalignment, the present invention provides a convenient system for bleeding the hydraulic fluid between the two hydraulic cylinders 40L, 40R in response to actuation by the machine operator, and upon movement of the steering wheels through a normal left and right steering cycle.

Figure 2:
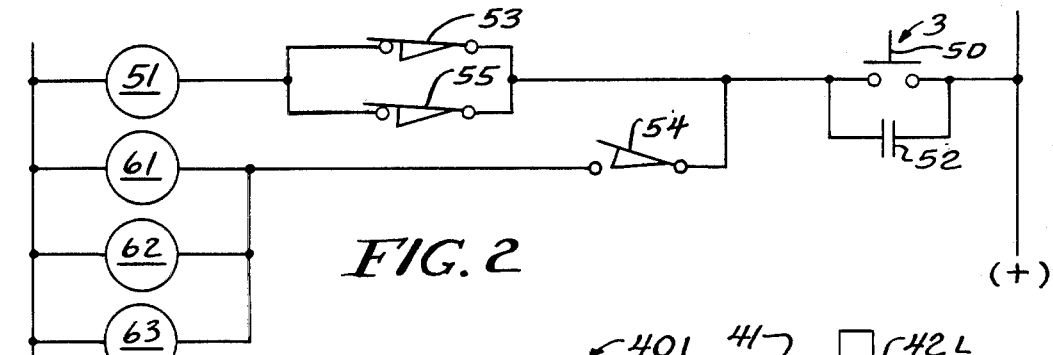
FIG. 2 is an electrical schematic of the hydraulic steering synchronization system of the invention.
Figure 3:
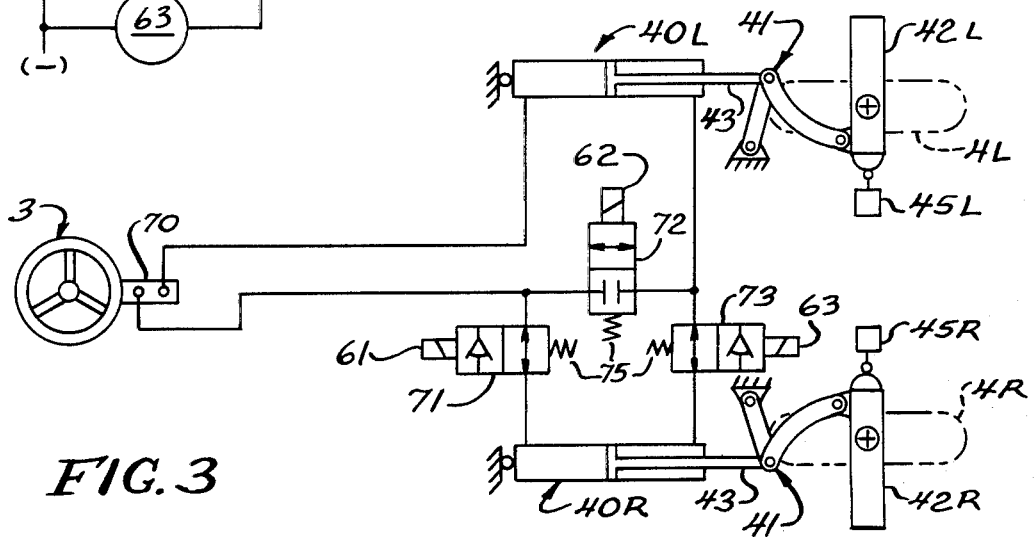
FIG. 3 is a mechanical schematic of the hydraulic circuit utilized to effect steering of the mobile hoist, and resynchronization of the steering wheels.

Referring to FIGS. 2 and 3, there is shown, respectively, an electrical and hydraulic schematic of the hydraulic steering synchronization system to illustrate the manner in which the system is actuated and effects resynchronization of steering alignment. In operation, the machine operator first depresses a button 50 to actuate the steering synchronizing system. Depressing the button 50 activates a relay 51, which closes normally open relay contact 52, completing a circuit until such time as the relay 51 is de-energized.

The machine operator steers the machine such that the right front wheel 4R is positioned for straight ahead movement. When steering wheel 4R reaches the position for straight ahead movement, the right wheel yoke 42R, or a portion thereof, will activate a limit switch 45R. The switch 45R is positioned on the machine frame adjacent to the wheel yoke 42R, such that upon the steering wheel 4R being positioned for straight ahead movement, the contacts thereof will be activated.

Switch 45R has two sets of contacts, 53 and 54, which are normally closed and normally open, respectively. Closing of normally open contact 54 completes a circuit to solenoids 61, 62, and 63, energizing the solenoids to effect movement of valves 71, 72, and 73, the operation of which is respectively controlled by these solenoids. Actuation of the valves 71 and 73, by solenoids 61 and 63, causes the valve spools associated therewith to shift blocking the flow of hydraulic fluid from the hydraulic cylinder 40R. The cylinder 40R is thereby hydraulically isolated from the hydraulic circuit thereby locking and holding the right front wheel 4R in the straight ahead position.

When the solenoid 62 is activated, the spool of valve 72 will shift from a position normally closed to fluid flow to a position wherein hydraulic fluid from a pump 70 will bypass hydraulic cylinder 40R and be coupled in fluid communication solely with hydraulic cylinder 40L.

The machine operator then turns the left front wheel 4L to a position for straight ahead movement. When that position is reached a limit switch 45L, positioned in the same manner as described with reference to switch 45R, will be activated by movement of the yoke 42L into the position for straight ahead movement of wheel 4L. Activation of limit switch 45L will open the normally closed contacts 55, which will interrupt the circuit to relay 51. De-energizing relay 51 will open relay contacts 52, thereby interrupting the circuit to solenoids 61, 62, and 63. De-energizing these solenoids will permit the springs 75 to shift the spool of valves 71, 72, 73 back to their initial position shown in FIG. 3, returning the realigned steering system for normal operation.

While the invention has been described with reference to a preferred embodiment, it will be understood by those skilled in the art that various changes may be made and equivalents may be substituted for the elements thereof which are shown in the drawings without departing from the scope of the invention. In addition, many modifications may be made to adapt a particular situation or material to the invention without departing from the essential scope thereof. Therefore, it is intended that the invention not be limited to the particular embodiment illustrated and described as the best mode presently contemplated for carrying out this invention, but that the invention will include any embodiments falling within the scope of the appended claims.

What is claimed is:

1. A synchronization system for automatically aligning the steerable wheels of a straddle-type hoist wherein steering is effected by movement of a pair of steerable wheels which are pivotal relative to the hoist frame and the pivotal movement of which is controlled by actuation of hydraulic cylinders secured to the hoist frame and operatively connected to each of the steering wheels, the synchronization system comprising at least left and right hydraulic fluid actuated cylinders, each of said cylinders having a first portion secured to the frame of a straddle hoist and having a second portion movable relative to the hoist frame upon actuation of said cylinder in response to pressurized hydraulic fluid coupled thereto, pump means for providing a source of pressurized hydraulic fluid coupled in fluid communication with each of said hydraulic fluid-actuated cylinders to effect the movement of said second portion thereof, at least left and right linkage means respectively mutually exclusively operatively connected to said second portion of said left and right hydraulic fluid-actuated cylinders, and to the left and right steering wheels of the straddle hoist to effect pivotal movement of the steering wheel to which said linkage means is operatively connected relative to the straddle hoist upon movement of said second portion of the hydraulic cylinder to which said linkage means is operatively connected, at least left and right switch means respectively mutually exclusively carried upon a portion of the straddle crane in a position to be actuated by the positioning of the left and right steering wheel in a position for straight ahead movement of the straddle hoist, and valve means coupled in fluid communication between said pump means and said left and right hydraulic fluid-actuated cylinders for selectively controlling the pressurized hydraulic fluid coupled thereto in response to control signals applied to said valve means upon the actuation of said left and right switch means.

2. The apparatus of claim 1 wherein said valve means are solenoid actuable to interrupt the coupling of pressurized fluid to one of said hydraulic fluid-actuated cylinders in response to the positioning of one of the steerable wheels in a position for straight ahead movement of the straddle hoist.

3. The apparatus of claim 2 wherein said solenoids are de-energized upon the positioning of the other one of the steerable wheels in a position for straight ahead movement of the straddle hoist.

4. A method of synchronizing the alignment of the steerable wheels of a straddle crane wherein left and right steerable wheels are each individually pivotal by actuation of a left and right hydraulic cylinder coupled in a hydraulic circuit and operatively connected to the respective left and right wheels of the straddle crane by a mechanical linkage system for pivoting the wheels in response to movement of the hydraulic cylinder comprising positioning a condition responsive signal emitting device adjacent to each of said left and right wheels to be actuated upon the sequential positioning of said wheels to effect straight ahead movement of said crane, positioning one of said wheels in a position to effect straight ahead movement of said crane to thereby actuate one of said condition responsive devices and emitting a signal therefrom, coupling said signal emitted from said condition responsive device to valve means coupled in the hydraulic circuit for selectively controlling the flow of hydraulic fluid in the hydraulic circuit to isolate one of the hydraulic cylinders therefrom for preventing further positioning of the wheel whose positioning caused said actuation of said condition responsive device, positioning of said other of said wheels in a position to effect straight ahead movement of said crane to thereby actuate said other condition responsive device and emitting a signal therefrom, coupling said signal emitted from said other condition responsive device to cancel the effect of said prior signal thereby returning the valve means to its prior condition allowing the flow of hydraulic fluid in the hydraulic circuit to both of the hyraulic cylinders.

5. The method of claim 4 wherein said condition responsive signal emitting devices are limit switches and said valves are solenoid valves actuated by the operation of said limit switches for controlling the flow of pressurized hydraulic fluid in the hydraulic circuit.

* * * * *